June 4, 1940.   J. M. SHANNON   2,203,473
FISH LURE
Filed Aug. 2, 1937
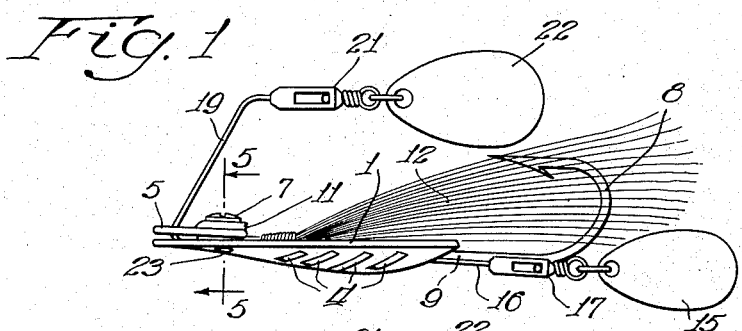
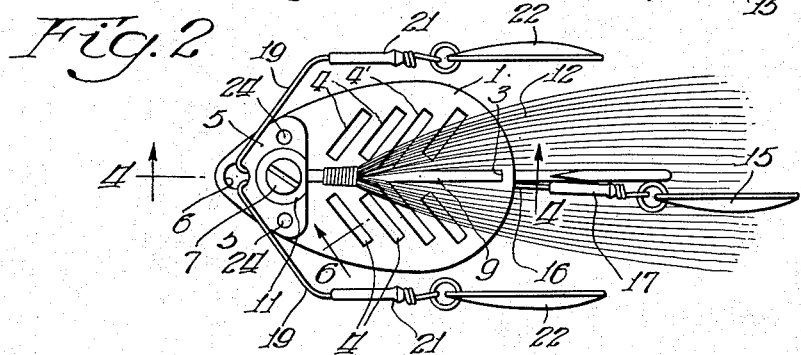
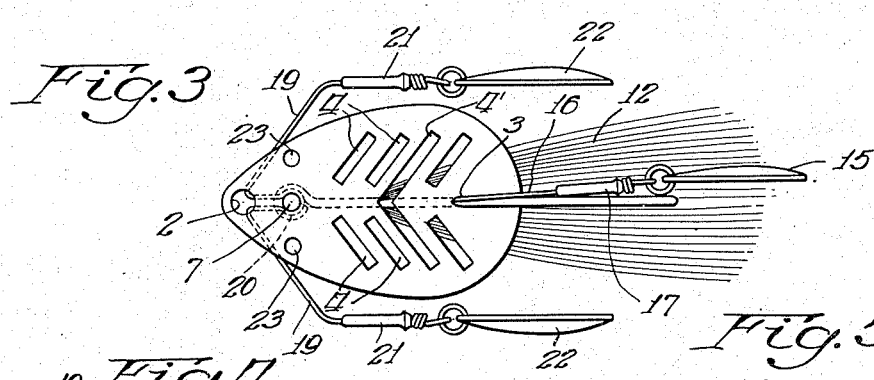
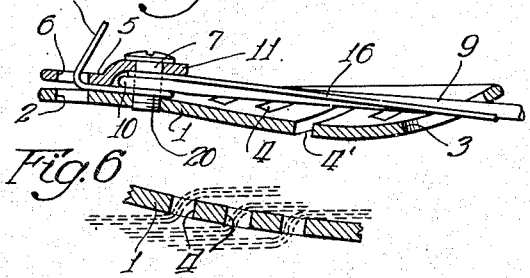
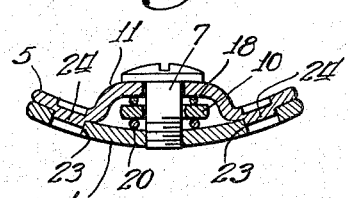
Witness:
V. Siljander
Inventor:
Jesse M. Shannon
By: Hill & Shee   Attys Patented June 4, 1940

2,203,473

UNITED STATES PATENT OFFICE 2,203,473

FISH LURE

Jesse M. Shannon, Chicago, Ill.

Application August 2, 1937, Serial No. 156,988

8 Claims. (Cl. 43—39)

My invention relates to a fish lure which may be used for either trolling or casting and with or without natural or artificial bait.

The invention has among its objects the production of a simple, efficient, attractive and durable device which will be particularly alluring to fish when the same is drawn through the water when reeling or trolling. Of course, the principal object is the production of a lure that will be as effective as possible for attracting fish, as well as to securely hook and hold the fish.

A further object is to construct a lure of the kind described that is substantially weedless, so that the same will not readily snag or become caught on weeds, lily pads, snags or other objects which are generally present in good fishing waters.

A further object is the production of a lure of the kind described in which the lure is of sufficient weight to perform its functions and yet light enough so that it will not plummet to the bottom or travel too low below the surface under ordinary conditions.

It has particularly as an object the production of a lure of the kind described that will substantially plane when drawn through the water, but, depending upon the speed of propulsion, will not rise to the top and tend to skim over the water unless such action is desired.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing, wherein like reference characters indicate like or corresponding parts:

Fig. 1 is a side elevation of the lure;

Fig. 2 is a top plan view of the same;

Fig. 3 is a similar view of the under side of the device;

Fig. 4 is an enlarged sectional view taken substantially on line 4—4 of Fig. 2;

Fig. 5 is a sectional view taken substantially on line 5—5 of Fig. 1, enlarged to show the construction; and Fig. 6 is an enlarged detailed sectional view taken substantially on line 6—6 of Fig. 2.

Referring to the drawing, 1 represents what may be termed a spoon shaped body plate, dished between the head and tail ends and side edges and provided with an aperture 2 at the head end for the attachment of a line or leader. As shown, the body plate in the preferred embodiment substantially conforms in contour or shape to the bowl of an ordinary tea or table spoon. At the rear or tail end is a slot 3 extending along the longitudinal central axis of the spoon, through which the shank of the hook and a spinner wire may extend, as will be more fully explained hereinafter. The body of the spoon or plate is provided with one or more openings, preferably in the form of slots 4, arranged at each side of the center line. Obviously, any or all of the openings or slots may extend along and cut the center line so that the openings are continuous from one side to the other across the plate, as is shown at 4' (see Fig. 3). These slots are of the desired size and shape and, in the preferred embodiment shown, extend angularly outwardly and rearwardly at each side of the center line of the spoon. Arranged at the head end of the body plate and conforming to the same is what may be designated as a head or retaining plate 5 provided with an opening 6 registering with the opening 2 in the plate 1, the head plate 5 being secured to the plate by a screw 7 or equivalent means for the purpose. The plate and screw constitutes means, as will be hereinafter described, for securing the several spinners and hook to the plate 1.

Secured to the plate 1 is a fish hook of the desired size and shape, consisting of the hook portion 8 and shank 9, the shank being formed with an eye 10 at the end opposite the hook 8. As most clearly shown in Figs. 4 and 5, the end of the shank with the eye is extended under the plate 5 which is shown cupped as at 11 to receive it and the same secured by the screw 7. Ordinarily there is provided an associated lure consisting of a buck tail 12 or feathers of the desired size and color or mixed colors, this depending upon the preference of the user.

There is also shown a tail spinner 15 which is so disposed relative the hook that it is below the same and extends slightly beyond the rear of the hook and plate. This spinner is connected to the more or less flexible wire 16 through a swivel 17, the head end of the wire 16 being looped around the screw 7 and secured between the plate 1 and head plate 5. I have also shown a wire 19 formed with a loop 20 which projects through the opening 6 in the head plate and is engaged and secured between the plates by the screw 7. The ends of the wire 19, which are generally preferred to be resilient and flexible, extend laterally outwardly at each side of the center line of the plate 1 and upwardly and rearwardly, as is clearly shown in Figs. 1 and 2, and to the ends of this wire may be connected additional spinners 22 by means of the swivels 21. It is desired generally that the spinners 22 be positioned at each side of the hook 8 and slightly above the same. The spinners 15 and 22 not only serve as effective devices to attract the fish, but they also tend to guard the hook and prevent its snagging or becoming caught in weeds or lily pads and the like. When the lure is travelling through the water these spinners 15 and 22, of course, spin around. As was before mentioned, the plate 5 is cupped or struck outwardly at 11 and is spaced at the rear from the plate, so that the eye 10 of the hook, the loop 18 of the wire 16 and the loop 20 of the wire 19 is contained between plate 1 and the head plate 5, with the screw 8 holding the parts in assembly. As shown, the device may be disassembled by removing the screw, so that the hook or other parts of the assembly may be changed if desired, or parts replaced. Obviously, a permanent connection may be made if that is preferred.

In order to prevent the head plate from turning out of position, in addition to the screw 7 there may be one or more openings or recesses 23 in the plate 1, the plate 5 being partially struck down to provide lugs 24 which seat in the recesses 23.

The parts of the lure may be given any desired finish, that is, plated, or painted in a combination of colors and finishes. The lure likewise may be made in a variety of sizes. It may also be made as decorative as desired, as for example, painting the lugs 24 or about the lugs and painting in the slots 4, so that the appearance of eyes and gills of fish are represented.

In use, as before mentioned, the lure may be cast and reeled in or may be used for trolling from a moving boat. When drawn through the water, it takes a position substantially as shown in Fig. 1, the depth from the surface of the water depending upon the speed with which the same is drawn through the water. If drawn very rapidly, it will tend to come very close to if not on the surface. At slower speeds it tends to settle down or travel a foot, eighteen inches or more or less or at any desired depth below the surface, depending upon the rate of travel. With the openings 4 or 4' the lure settles and moves more evenly in the water, and the tendency to come to the top is not so noticeable. The water below the plate 1 may come up through the openings 4 substantially as shown in Fig. 6 and this appears to assist in preventing the spoon from planing to the surface of the water. This also accomplishes another thing, the ripples of the water in surging through the openings appear to attract more attention to the lure. In some ways the slots appear to resemble the gills of a fish when viewed from below or the side. It will be noted by referring to Fig. 6, that due to the spoon shape of the plate 1 and arrangement of the slots 4, the rear or trailing edges of the slots are a trifle below the advancing edges, so that the tendency of the water in striking the rear edge or side of the slots is to move up through and over the top face of the plate. This action of the water above the spoon also probably has a tendency to additionally agitate the buck tail 12. While I have not shown any additional bait on the lure, such as a pork rind, minnow or the like, it is of course obvious that such additional elements may be employed when the device is in use.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A fish lure consisting of a spoon shaped plate arranged at the head end for attachment to a line, and provided with a hook member having a shank extending from the head end rearwardly from the tail end and terminating in a hook, said plate having a plurality of slots through the same at each side of the central axis, the respective slots on each side of said axis being substantially parallel with one another and transverse to the slots on the other side of said axis.

2. A fish lure consisting of a plate arranged at the head end for attachment to a line, and provided with a hook member extending rearwardly from the tail end, said plate having an opening through the same at each side of the central axis of the plate for the passage of water therethrough, said hook member including a shank provided with an eye at one end arranged on the plate with the eye at the head end thereof, a head plate arranged over said eye and fastening means for securing said head plate and shank to the head end of the plate, said shank extending rearwardly through the plate at the tail end and terminating in a hook at the free end, a spinner, and a tow wire therethrough extending along said shank and secured at the head end of the plate by said fastening means.

3. In a device of the kind described, a spoon shaped plate, a hook member having a shank with an eye at one end and hook at the other end, a spinner and wire connected therewith, said wire extending along said shank to the head end of the plate, a pair of spinners arranged one at each side of and above said hook, a flexible wire connected to said spinners and extended to the head end of said plate adjacent said shank eye, a plate overlying said shank and fastening means for securing said head plate, wires, hook and body plate in assembled relation.

4. A fish lure of the kind described comprising a spoon shaped body plate having openings therethrough at either side of the center, a head plate mounted at the head end of said body plate, a hook having a shank provided with a hook at one end and with an eye at the other end, a spinner arranged substantially at the rear of said hook end and provided with a wire swiveled to the spinner, said wire being formed substantially with an eye at the free end, a wire provided with a loop intermediate its ends and bent upwardly and rearwardly, said shank eye, first mentioned wire and looped wire extended under said plate, and means for securing said head plate, wires, hook and body plate together, there being a spinner swiveled to each end of said looped wire.

5. A fish lure consisting of a spoon shaped body plate arranged at the head end for attachment to a line, and provided with a slot at the tail end, a fish hook having a shank provided with an eye at one end and hook at the other end arranged on the plate with the eye at the head end thereof, a head plate arranged over said eye and a screw for detachably securing said head plate and shank to the head end of the plate, means for preventing rotation of the head plate on the body plate, said shank extending rearwardly through said slot at the tail end of the plate and terminating in a hook at its free end, a tow wire extending along said shank and secured at the head end of the plate by said screw, a spinner swiveled to said tow wire.

6. A fish lure of the kind described comprising the combination of a spoon shaped body plate having an opening therethrough intermediate the ends and side edges, and an opening adjacent both the head and tail ends, a head plate mounted at the head end of said body plate, a hook member having a shank provided with a hook at one end and with an eye at the other end, a spinner arranged adjacent the said hook end of the shank and provided with a wire swiveled to the spinner, said wire being formed substantially with an eye at the free end, a wire provided with a loop intermediate its ends and bent upwardly and rearwardly and terminating in a spinner at each free end swiveled thereto, said shank eye, first mentioned wire loop and looped wire being extended under said head plate, and means common to all for securing said head plate, wires, hook and body plate together.

7. A fish lure consisting of a spoon shaped plate arranged at the head end for attachment to a line, and provided with a hook extending rearwardly from the tail end, said plate having a linear slot through the same substantially adjacent to the transverse medial axis, at each side of and transverse to the longitudinal axis of the plate for the passage of water therethrough, the portion of said slot on one side of the axis being transverse to the portion on the opposite side thereof, and water actuable means extending along the longitudinal axis above said plate substantially in the path of water passing through said slot.

8. A fish lure consisting of a plate arranged at the head end for attachment to a line, and provided with a hook extending rearwardly from the tail end, said plate having a plurality of linear openings therethrough substantially adjacent to the transverse medial axis, at each side of and transverse to the longitudinal axis of said plate, the openings on one side being similarly positioned to the openings on the other side relative said longitudinal axis, whereby the tendency of the lure to plane on the surface of the water is reduced without otherwise materially affecting the action of the lure.

JESSE M. SHANNON.